United States Patent
Mochalov

(10) Patent No.: US 11,128,441 B2
(45) Date of Patent: Sep. 21, 2021

(54) METHOD FOR PROTECTING DATA TRANSFER USING NEURAL CRYPTOGRAPHY

(71) Applicant: Timofey Mochalov, Kaluga (RU)

(72) Inventor: Timofey Mochalov, Kaluga (RU)

( * ) Notice: Subject to any disclaimer, the term of this patent is extended or adjusted under 35 U.S.C. 154(b) by 0 days.

(21) Appl. No.: 16/892,319

(22) Filed: Jun. 4, 2020

(65) Prior Publication Data
US 2020/0304292 A1    Sep. 24, 2020

(30) Foreign Application Priority Data

May 18, 2020    (LT) ................................. 2020 525

(51) Int. Cl.
| | |
|---|---|
| *H04L 9/06* | (2006.01) |
| *G06N 3/10* | (2006.01) |
| *H04L 9/08* | (2006.01) |
| *H04L 9/32* | (2006.01) |

(52) U.S. Cl.
CPC ............. *H04L 9/0637* (2013.01); *G06N 3/10* (2013.01); *H04L 9/0861* (2013.01); *H04L 9/3263* (2013.01); *H04L 2209/16* (2013.01); *H04L 2209/38* (2013.01)

(58) Field of Classification Search
CPC ..... G06N 20/00; H04L 67/12; H04L 67/1097; H04L 9/3247; H04L 9/085; H04L 9/0894; H04L 9/3236; H04L 9/0825; H04L 9/0866; H04L 9/0861; H04L 9/0891; H04L 9/321; H04L 63/00; H04L 63/0428; H04L 63/04; H04L 63/123; H04L 63/126; G06F 21/6218
See application file for complete search history.

(56) References Cited

U.S. PATENT DOCUMENTS

| | | | |
|---|---|---|---|
| 9,946,970 B2 * | 4/2018 | Gilad-Bachrach ... | G06N 3/0481 |
| 10,289,816 B1 * | 5/2019 | Malassenet ......... | G06F 9/30036 |
| 2015/0215127 A1 * | 7/2015 | Sabottke ............... | H04L 9/0866 380/28 |
| 2017/0063541 A1 * | 3/2017 | Cheng .................... | H04L 9/0852 |
| 2017/0372226 A1 * | 12/2017 | Costa ...................... | G06N 20/00 |
| 2019/0012595 A1 * | 1/2019 | Baser ..................... | H04L 9/3239 |

(Continued)

OTHER PUBLICATIONS

Yayik and Kutlu, "Neural Network Based Cryptography", Neural Network World, May 2014, p. 177-192.

(Continued)

*Primary Examiner* — Tae K Kim
(74) *Attorney, Agent, or Firm* — AAA Law, UAB

(57) ABSTRACT

A method of encryption and decryption of data over a network using an artificial neural network installed on each node of the network. The data protection elements—encryption keys, encryption algorithms, and encryption obfuscation—are generated or selected, respectively, at a new instance of communication across the network and no data protection elements are transmitted across the network. The artificial neural network is trained on a blockchain with the addition of each new block to the blockchain and is used to generate a finite set of encryption keys at each node simultaneously. Such encryption keys, encryption algorithms and encryption obfuscation are associated with the neural network on each node and are then used for decryption of the transmitted data.

9 Claims, 3 Drawing Sheets

(56) References Cited

U.S. PATENT DOCUMENTS

| | | | |
|---|---|---|---|
| 2019/0087689 A1* | 3/2019 | Chen | G06N 3/08 |
| 2019/0228006 A1* | 7/2019 | Tormasov | H04L 9/3239 |
| 2019/0236598 A1* | 8/2019 | Padmanabhan | G06Q 20/4016 |
| 2019/0281066 A1* | 9/2019 | Simons | H04L 63/105 |
| 2019/0334716 A1* | 10/2019 | Kocsis | H04L 63/0442 |
| 2020/0021569 A1* | 1/2020 | Simons | H04L 63/08 |
| 2020/0028824 A1* | 1/2020 | Baughman | H04W 12/001 |
| 2020/0099508 A1* | 3/2020 | Ghorbani | H04L 9/008 |
| 2020/0104636 A1* | 4/2020 | Halevi | G06K 9/6228 |
| 2020/0125739 A1* | 4/2020 | Verma | G06N 3/0454 |
| 2020/0204412 A1* | 6/2020 | Fompeyrine | H04L 27/223 |
| 2020/0218940 A1* | 7/2020 | Anglin | G06F 21/64 |
| 2020/0412532 A1* | 12/2020 | Shi | H04L 9/302 |

OTHER PUBLICATIONS

Sgantzos, and Grigg, "Artificial Intelligence Implementations n the Blockchain. Use Cases and Future Applications", Future Internet, 2019, 11, 170.

* cited by examiner

METHOD FOR PROTECTING DATA TRANSFER USING NEURAL CRYPTOGRAPHY

FIELD OF THE INVENTION

The present invention relates to a method of cryptography and in particular to a computer implemented method of encryption and decryption of data using artificial neural network and blockchain data structure security.

BACKGROUND ART

Data security is a prime concern in data communication systems. Neural Cryptography is a method of encoding and decoding data using an artificial neural network. Artificial neural networks (here forth, ANN) are well known for their ability to selectively explore the solution space of a given problem. This feature finds a natural niche of application in the field of cryptanalysis. At the same time, neural networks offer a new approach to attack ciphering algorithms based on the principle that any function could be reproduced by a neural network, which is a powerful proven computational tool that can be used to find the inverse-function of any cryptographic algorithm. Neural cryptography is usually based either on creating a public private key pair using neural networks; on using a blockchain to store encryption keys in the form of hashes, or stored in the blockchain of ANN elements. Usually neural cryptography deals with the problem of "key exchange" between two neural networks by using the mutual learning concept. The two networks exchange their outputs (in bits) and the key between two communicating parties is eventually represented in the final learned weights, i.e. when the two networks are said to be synchronized. Security of neural synchronization is put at risk if an attacker is capable of synchronizing with any of the two parties during the training process.

A method of artificial neural network based cryptography is disclosed in the paper "Neural Network Based Cryptography" by Apdullah Yayik and Yakup Kutlu, May 2014 Neural Network World, pg. 177-192, DOI: 10.14311/NNW.2014.24.011. The method consists of two stages. In the first stage, neural network-based pseudo-random numbers (NPRNGs) are generated and the results are tested for randomness using National Institute of Standard Technology (NIST) randomness tests. In the second stage, a neural network-based cryptosystem is designed using NPRNGs. In this cryptosystem, data, which is encrypted by non-linear techniques, is subject to decryption attempts by means of two identical artificial neural networks. With the first neural network, non-linear encryption is modeled using relation-building functionality. The encrypted data is decrypted with the second neural network using decision-making functionality.

A method of using blockchain in conjunction with artificial neural network is disclosed in article "Artificial Intelligence Implementations on the Blockchain. Use Cases and Future Applications", Konstantinos Sgantzos, Ian Grigg, Future Internet 2019, 11, 170; doi:10.3390/fi11080170.

Main drawbacks of the prior art are that neural networks are used either to create an encryption key or to create an asymmetric encryption key pair or to store encryption keys in the blockchain in one form or another.

The present invention is dedicated to overcoming of the above shortcomings and for producing further advantages over prior art.

BRIEF DESCRIPTION OF THE INVENTION

A method of encryption and decryption of data over a network using an artificial neural network installed on each node of the network. The data protection elements—encryption keys, encryption algorithms, and encryption obfuscation—are generated or selected, respectively, at a new instance of communication across the network and no data protection elements are transmitted across the network. The artificial neural network is trained on a blockchain with the addition of each new block to the blockchain and is used to generate a finite set of encryption keys at each node simultaneously. Such encryption keys, encryption algorithms and encryption obfuscation are associated with the neural network on each node and are then used for decryption of the transmitted data.

BRIEF DESCRIPTION OF THE DRAWINGS

Features of the invention believed to be novel and inventive are set forth with particularity in the appended claims. The invention itself, however, may be best understood by reference to the following detailed description of the invention, which describes exemplary embodiments, given in non-restrictive examples, of the invention, taken in conjunction with the accompanying drawings, in which:

Figure 1:
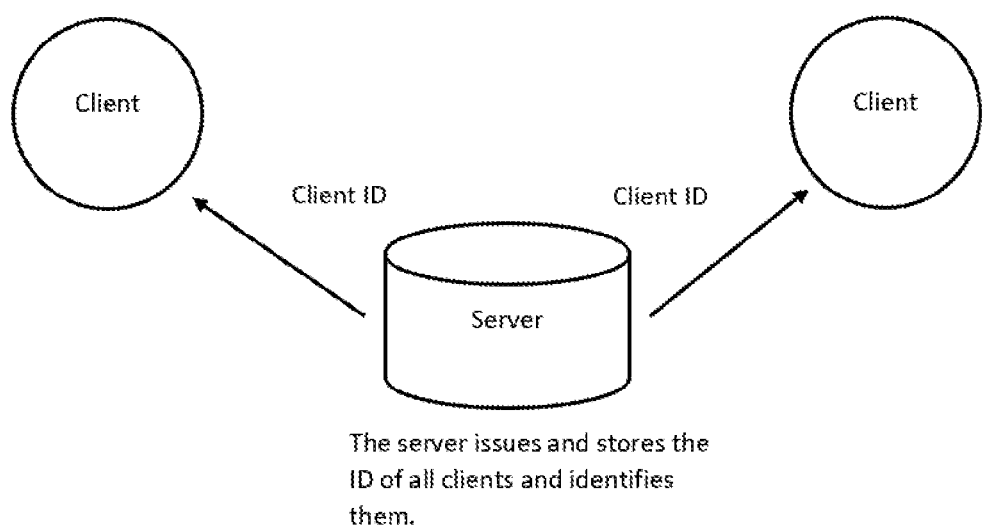
FIG. 1—primary network client identification scheme. The server distributes client ID and a personal secret (personal data set or cipher block) for each client.

Preferred embodiments of the invention will be described herein below with reference to the drawings.

DETAILED DESCRIPTION OF THE INVENTION

It should be understood that numerous specific details are presented in order to provide a complete and comprehensible description of the invention embodiment. However, the person skilled in art will understand that the embodiment examples do not limit the application of the invention, which can be implemented without these specific instructions. Well-known methods, procedures and components have not been described in detail for the embodiment to avoid misleading. Furthermore, this description should not be considered to be constraining the invention to given embodiment examples but only as one of possible implementations of the invention.

Although numerous characteristics and advantages together with structural details and features have been listed in the present description of the invention, the description is provided as an example fulfillment of the invention. Without departing from the principles of the invention, there may be changes in the details, especially in the form, size and layout, in accordance with most widely understood meanings of the concepts and definitions used in claims.

Short Explanation of Terms

Data—plaintext and other non-transitory computer-stored media.

Clients—computer devices such as wireless devices, computer processors, sensors, other devices capable of data processing.

Nodes—clients, servers.

Sender and receiver—at each data transfer session, one client node sends data and is a sender and at least one client node receives data and is a receiver.

Client ID—a unique 256-512 bit key, X509 certificate, or both.

Data transfer session—a period of time in which one client node is a sender and at least one client node is a receiver and all nodes have synchronized identification keys.

Artificial Neural Network (ANN)—an information processing and modeling system which mimics the learning ability of biological systems in understanding unknown process or its behavior. An Artificial Neural Network is a network of many very simple processors (units), each possibly having a (small amount of) local memory. The units are connected by unidirectional communication channels, which carry numeric data. The units operate only on their local data and on the inputs they receive via the connections.

Blockchain—a fully shared ledger that is globally visible to all parties when a transaction is recorded on it without any presence of a trusted central authority.

Symmetric encryption—in symmetric key encryption, a secret key is shared between the sender and receiver clients. The word "symmetric" refers to the fact that both sender and receiver use the same key to encrypt and decrypt the information.

Asymmetric encryption—The method of neural encryption and decryption comprises using neural networks together with symmetric encryption algorithms on a computer network. A computer network is preferably a blockchain type computer network.

Encryption obfuscation methods—when plaintext is encrypted with one encryption algorithm with one symmetric encryption key, and then over it is encrypted with another encryption algorithm with another symmetric encryption key, randomly adding random garbage (non-encrypted characters or random bits) to the plaintext before the encryption process, adding garbage (a random set of bits to different places) in already encrypted data or in separate blocks, shifting ciphertext over a specific vector and others.

According to one embodiment of the invention, a computer implemented neural cryptography method for protection of data transfer over a network using synchronized copies of ANN at each node eliminates transferring data protection parameters over a network. A network is one of the Internet or local computer network comprising at least two client nodes for sending and receiving data and at least one server node. At each node, a copy of ANN is stored.

The server sends client ID to client nodes at the very beginning of work, which forms the network. FIG. 1 shows this network identification scheme for establishing a data transfer session.

In the network, the ANN on each node is synchronized using client ID and random bits (transmitted by the server) at the beginning of the data transfer session to form a single set of keys and algorithms used between the sender, receiver and the server. During each data transfer session, encryption keys are generated simultaneously on all nodes using ANN, and encryption algorithms and entanglement procedures are selected simultaneously on all nodes ANN from a finite set of encryption protocols.

The data is encrypted on the sending node and then transmitted to the identified server for decryption and re-encryption (taking into account client ID and random bits serving as input data for the receiver and server ANN neurons) before the final transmission of the encrypted data to the final node, the receiver.

The generated encryption keys and selected encryption algorithms and obfuscation procedures are used by ANN to encrypt and decrypt data for transmission between the nodes of the sender, receiver and server.

Figure 2:
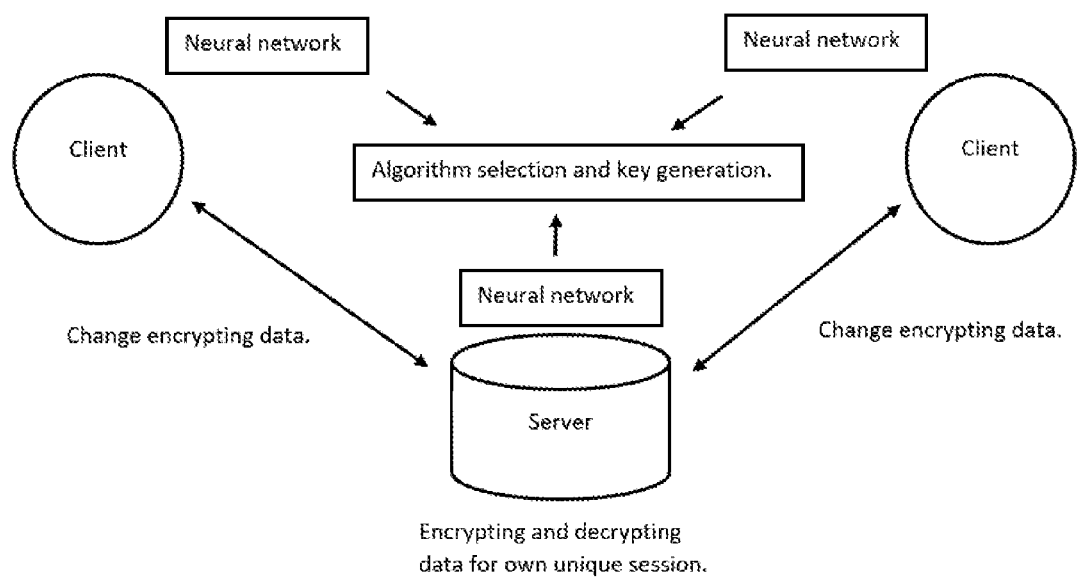
FIG. 2—encryption scheme of transmitted data, selection of an encryption algorithm and an encryption key for each data transfer session.

Each ANN uses a different set of encryption keys and encryption algorithms and obfuscation procedures from the final set of encryption protocols to re-encrypt and decrypt between the server and the receiver nodes in the network for each session separately, as shown in FIG. 2.

Figure 3:
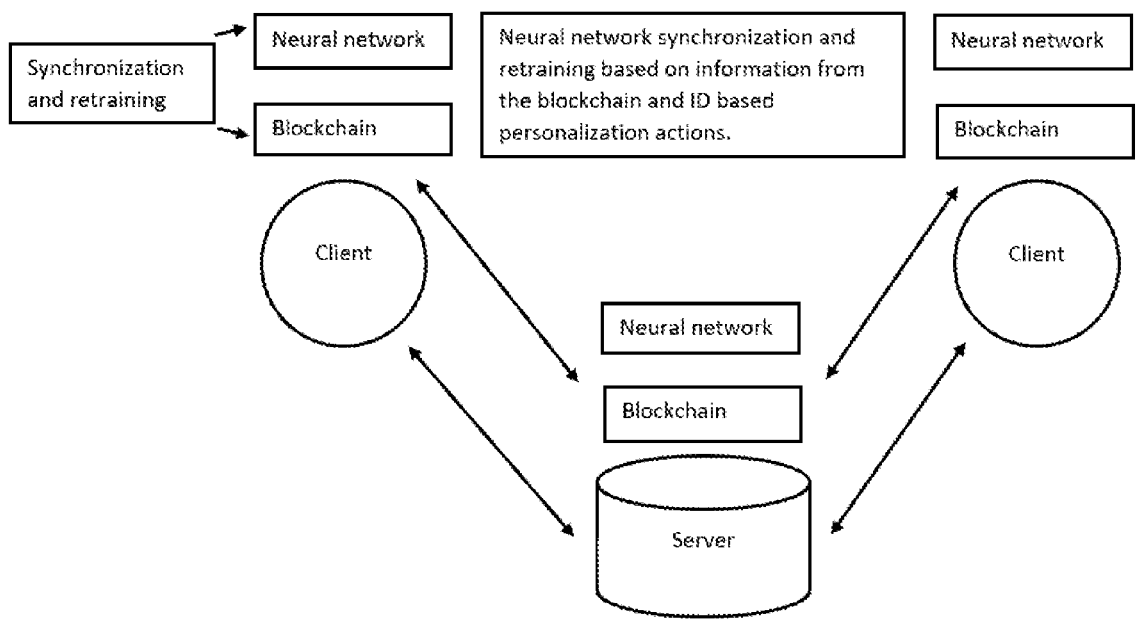
FIG. 3—principle of synchronization and retraining of neural networks for changing the logic (using training data from the blockchain network) of choosing encryption algorithms, as well as choosing a new way to create encryption keys, is shown.

An embodiment of continuously synchronized and self-training ANNs between the server and all other nodes of the network, for which self-identifying user key (client ID) and blockchain data is used, is shown in FIG. 3. Retraining ANN occurs with the advent of each new block in the blockchain before the start of data transfer. The frequency of updating or the appearance of new blocks in the blockchain depends on the task and the specific network structure. This can be once a week, once a day, or once an hour and others.

A blockchain of the type "Fully private blockchain" or "Permissioned private ledgers" is used where the server acts as the only blockchain node. Each other node, sender node and at least one receiver node, has a copy of the blockchain data. The server node is engaged in creating new blocks, the blockchain is updated at the server's initiative, that is, centrally. Each time the blockchain is changed (adding a new block), the ANN is retrained on the server node and then on each other node. The data from the blockchain is used as input to change the weights of the ANN on all nodes. The retraining process is controlled from the server by creating new blocks and updating the blockchain.

According to one embodiment of the invention, deciding on all parameters of data protection is made using a specially trained and configured ANN, which is copied in each network node, and all ANN copies are synchronized with each other.

According to another embodiment of the invention, when the method is used in a network with a central server node, the trained ANN is used on the side of the sender node (or the receiver node) and on the side of the server identification node.

An encryption key is created simultaneously on the side of the sender node (or on the receiver node) and simultaneously on the server node, which eliminates the stage of transmitting the encryption key over the network. In this case the data transmission has a centralized star-type scheme through its identifying server, which can be located both on the Internet and on the local network. When data is transmitted from a senders node to at least one receiver node through an identifying server node, after receiving information from the sender node at the server node the data is decrypted and re-encrypted with other parameters such as encryption algorithm, another encryption key, additional data protection parameters from a specific set of actions, for transmission to a final receiver.

In this embodiment, the encrypting ANN creates an encryption key, chooses an encryption algorithm and other actions (encryption obfuscation) at the node, which is encrypting data for transfer. The sender ANN itself selects the encryption algorithm and encryption key at a certain point in time, as well as additional methods of obfuscating and protecting traffic by synchronizing with the ANN server node. The ANN on the server node decrypts and re-encrypts the data with a key synchronized with the receiver's ANN, where ANN on the receiver node uses the same encryption algorithm and selects the encryption key from the same final set as the key with which the data sent was encrypted from the identifying server node.

In a preferred embodiment, symmetric encryption algorithms are used such as AES 256, 3DES, ChaCha, Salsa20, Blowfish, Twofish, DES, Kuznechik and others.

In another embodiment, the ANNs are synchronized in each of the nodes twice. The first synchronization of the ANNs occurs with the advent of a new block in the blockchain (this is configured for each system separately). Secondly, re-synchronization occurs with the central distribution of identification keys (client ID) across all nodes in the network; that is, the sender, receiver and the presence of all client ID on the server node. Client ID data is involved in the set of data supplied to the network inputs at the moment of establishing a new data transfer session. The ANN on each network node constantly changes the general encryption logic through continuous self-learning, which uses a self-identifying user key (client ID) and blockchain data. Self-learning and network synchronization takes place on the basis of new blockchain blocks, the synchronization of a particular node at the beginning of the session occurs using random data transmitted from the server (random bites) and the client ID of the node.

In another embodiment, the encryption algorithms themselves and various schemes for obfuscating or using one encryption algorithm are implemented programmatically, separately from the neural network, in a separate software module. When creating a new client-server data transfer session, a finite set of encryption keys and actions is obtained which are applied specifically for the session.

In yet another embodiment, retraining based on blockchain data (which can be separate hashes from a set of blocks, a hash tree or Merkle tree) on the client occurs when a new block appears on the blockchain. After retraining, the ANN weights and the output values that ANN generates at the beginning of the data transfer session change. Accordingly, controlling the process of changing the weights of the neural network (training on data from the blockchain) and submitting unique data to the input of the neural network for each prediction, we get encryption keys unique to each session and client and a set of encryption-related actions such as: choosing encryption algorithms and the procedure for changing them, applying one encryption algorithm to another, adding garbage to the encrypted data, all this will be used only for this session and for this client. For a new data transfer session, the output set ANN will be different.

All elements of the network, the client nodes and server nodes have a similar architecture, a blockchain, a ANN in identical condition, and a software module that processes the output parameters of the ANN to make the final decision in choosing an algorithm and using encryption keys.

At the beginning of each data transfer session, the server node creates and sends a set of random parameters (256-512 bits) to the client for the input of the ANN. Further the server node creates and stores all the client IDs, therefore, when establishing a data transfer session, data from a server node with a particular client node, it can duplicate the state of the ANN and its output data on its side by selecting the same set of keys, the same sequence of actions and the same encryption algorithms that were selected for this session on the client side. That is the set of parameters is synchronised, the weights of the neural network and the data that is submitted to the ANN primarily on the server node and on the client node with which the data is exchanged.

The following are examples of a computer implemented neural cryptography method for protection of data transfer.

For example a ANN is trained on a certain dataset. The ANN has a certain number of input neurons preferably equal to the amount of input data for prediction using ANN. For example two datasets of parameters can be used. An initial 256-512 bit random dataset is transmitted over the network to the moment of client-server connection from the server, the second dataset is a personal client ID which can be either a unique 256-512 bit key, X509 certificate, or both depending on the final task. The dataset parameters in addition to identifying the client, serve as a training dataset for ANN.

At the time of the client-server connection, data transfer session, two datasets with a total input quantity of 512-1024 bits is run through ANN. On the output layer of neurons, three datasets are obtained, which are 256-512 bit encryption key elements, which depend on the final goal and the task of using neural network. The second dataset is the sequence of displacement of elements in the first dataset to create a range of keys based on the data received in first dataset of values.

For example, a dataset consisting of 256-512 bit in the first dataset (to create an encryption key), in the second dataset we have a set of offset parameters, applying it to the first dataset as a mask or as an offset vector, we can get 256 offset options in keys from the received bits (or a larger number of options depending on the final task set), then during software processing and obtaining keys, exactly the same keys obtained on the basis of the first dataset will be used, taking into account the offset by the superimposed from the second dataset.

Accordingly, at the beginning of a data transfer session, the first of the received set of keys will be used and then the second and so on up to 256 offset options (or any other range laid down during the initial creation of ANN).

The third ANN dataset is responsible for the encryption algorithm chosen, the sequence of change of encryption algorithms, and other tasks associated with obfuscating the encryption process.

For example a set of algorithms from 3 symmetric encryption algorithms may be used changing their sequence and logic of working with them in accordance with the third dataset parameters received from the neural network.

The method may also be employed in a decentralized system like a blockchain without a central identifying server and with many blockchain nodes (not one node, as in a centralized scheme). Blockchain used of the type "Fully private blockchain" or "Permissioned private ledgers". Each node has a copy of the blockchain data. In a centralized scheme, the server is responsible for creating new blocks of the blockchain. In a decentralized scheme for creating blocks, each individual node of the blockchain network is responsible. Each time the blockchain is changed (adding a new block), the ANN is retrained on the client side and on each other nodes, the data from the blockchain is used as input to change the weights of the ANN.

The ANN will constantly change the general encryption logic through continuous self-training, for which self-identifying user key (client ID) is used, as well as data from the blockchain network, which are used as a data set for retraining the neural network but not for storing keys or generating them based on blockchain.

The method can be used for protection against quantum computing due to the floating logic of data encryption, the absence of the need to transmit the key over the network, and the use of symmetric encryption algorithms that are resistant to quantum computing.

Although numerous characteristics and advantages together with structural details and features have been listed in the present description of the invention, the description is provided as an example fulfillment of the invention. Without departing from the principles of the invention, there may be changes in the details, especially in the form, size and layout, in accordance with most widely understood meanings of the concepts and definitions used in claims.

The invention claimed is:

1. A computer implemented method of encryption and decryption of data transmission over a network wherein said network comprises at least two client nodes and at least one server node, wherein said network is configured for centralized star-type data transmission, wherein the at least two client nodes and at least one server node comprise a blockchain and identical copies of an artificial neural network, the artificial neural network being trained on the blockchain, wherein the at least one server node is configured to produce new blocks for the blockchain, wherein the method comprises:

configuring the network wherein the at least one server and a first client node perform the follow steps, then the following steps are repeated by the at least one server node and at least one other client node:

producing, at the at least one server node, a unique set of input parameters for one client node;

sending a unique set of input parameters to one client node from the at least one server node;

synchronizing the ANN at the one client node and at least one server node using the unique set of input parameters;

creating encryption keys using the synchronized ANN and the unique set of input parameters for one client node at one client node and at the at least one server node;

creating a set of output parameters using the synchronized ANN and blockchain data at one client node and at the at least one server node;

selecting a symmetric encryption algorithm and type of encryption obfuscation using the output parameters from the synchronized ANN at one client node and at the at least one server node;

synchronizing the said encryption keys, selected symmetric encryption algorithms, and selected encryption obfuscations at one client node and at the at least one server node; and the method further comprising steps for data encryption and transmission:

encrypting data at the first client network node using encryption keys, selected symmetric encryption algorithm, and selected encryption obfuscation of the first client node;

transmitting encrypted data from the first client node to the at least one server node;

decrypting the data, at the at least one server node, using synchronized encryption keys, selected symmetric encryption algorithm, and selected encryption obfuscation of the first client node;

re-encrypting the data at the server node using the synchronized encryption keys, selected symmetric encryption algorithm, and selected encryption obfuscation of the at least one other client node;

transmitting re-encrypted data from the server node to the at least one other client node; and decrypting the data, at the at least one other client node, using synchronized encryption keys, selected symmetric encryption algorithm, and selected encryption obfuscation of the at least one other client node;

wherein the method further comprises the steps of retraining the ANN on the blockchain including:

computing a new block of the blockchain at the at least one server node;

transmitting the updated blockchain from the at least one server node to each client node; and retraining the artificial neural network at each node of the network using the updated blockchain.

2. The method of claim 1 wherein a network is the Internet or a local computer network.

3. The method of claim 1 wherein one subset of the unique sets of input parameters is randomly generated.

4. The method of claim 1 wherein one subset of the unique sets of input parameters is a unique 256-512 bit key, X509 certificate, or both.

5. The method of claim 1 wherein the encryption keys are created on one of the at least two client nodes and at least one server node simultaneously.

6. The method of claim 1 wherein the symmetric encryption algorithm is selected from AES 256, 3DES, ChaCha, Salsa20, Blowfish, Twofish, DES, and Kuznechik.

7. The method of claim 1 wherein the encryption keys are not transmitted over the network.

8. The method of claim 1 wherein the encryption keys are not stored on the blockchain.

9. The method of claim 1 wherein no artificial neural network elements are stored on the blockchain.

* * * * *